(12) United States Patent
Savoie et al.

(10) Patent No.: US 12,709,235 B2
(45) Date of Patent: Aug. 18, 2026

(54) MOUNTING ASSEMBLY AND VEHICLE HAVING SAME

(71) Applicant: BOMBARDIER RECREATIONAL PRODUCTS INC., Valcourt (CA)

(72) Inventors: Felix Savoie, Sherbrooke (CA); Remi Larrouy, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 532 days.

(21) Appl. No.: 18/240,404

(22) Filed: Aug. 31, 2023

(65) Prior Publication Data

US 2025/0074327 A1 Mar. 6, 2025

(51) Int. Cl.
*B60R 11/02* (2006.01)
*B60R 11/00* (2006.01)

(52) U.S. Cl.
CPC ....... *B60R 11/02* (2013.01); *B60R 2011/0005* (2013.01); *B60R 2011/0057* (2013.01)

(58) Field of Classification Search
CPC ....... B60R 7/08; B60R 11/02; B60R 11/0252; B60R 2011/0005; B60R 2011/0057
USPC ......................... 296/1.07, 24.34, 37.12, 78.1
See application file for complete search history.

(56) References Cited

U.S. PATENT DOCUMENTS 11,548,451 B2 * 1/2023 Jankura .................... B60R 11/02
11,979,048 B2 * 5/2024 Huffman ............. B60R 11/0241
2014/0354002 A1 * 12/2014 Bisceglia ............... B60K 35/10 296/37.12
2023/0382492 A1 * 11/2023 Blouin ................... B62M 27/02

* cited by examiner

*Primary Examiner* — Jason S Daniels
(74) *Attorney, Agent, or Firm* — BCF LLP

(57) ABSTRACT

A vehicle includes a mounting assembly for selectively connecting a device to the vehicle. The mounting assembly includes at least one cowling, a magnet, a support surface and a ferromagnetic plate. The support surface defines a receiving recess that is in alignment with the magnet along a normal of the support surface. The ferromagnetic plate is configured to connect to the device, is sized and shaped to be received in the receiving recess, and is selectively magnetically connected to the magnet. When the ferromagnetic plate is connected to the device and received in the receiving recess, the ferromagnetic plate is magnetically connected to the magnet. In response to a force causing the ferromagnetic plate to disconnect from the magnet, a bottom edge of the device contacts the support surface at a contact point below the receiving recess, and pivots about a pivot axis passing through the contact point.

21 Claims, 10 Drawing Sheets

201
207
212
210
234
200
104
232
202
230
122
222
224
220
120
100
204
206
208
240
203
242

260
CP
207
122
201
212
210
204
206
208
222
224
200
232
120
104
114
132
102

MOUNTING ASSEMBLY AND VEHICLE HAVING SAME

FIELD OF TECHNOLOGY

The present technology relates to mounting assemblies and vehicles having mounting assemblies for devices.

BACKGROUND

There exist various types of mounting assemblies for holding a device, such as a mobile phone, on a dashboard of a vehicle. Some of these mounting assemblies include a magnet and can be referred to as magnetic mounting assemblies.

Some conventional magnetic mounting assemblies are made small so as to not occupy too much space on the vehicle. These smaller magnetic mounting assemblies may, however, not be suitable to hold heavier devices.

One proposed solution for larger or heavier devices is to provide mounting assemblies having large magnets to support heavier devices. However, these can be bulky and therefore cumbersome to store on the vehicle.

Thus, there is a desire for a mounting assembly to address at least some of the issues noted above.

SUMMARY

It is an object of the present technology to ameliorate at least some of the inconveniences present in the prior art.

According to one aspect of the present technology, there is provided a vehicle including a frame, a plurality of cowlings connected to the frame, a propulsion assembly supported by the frame, and a mounting assembly for selectively connecting a device to the vehicle. The mounting assembly includes at least one cowling of the plurality of cowlings, a magnet, a support surface and a ferromagnetic plate. The magnet is disposed on an interior side of the at least one cowling. The support surface is defined on an exterior side of the at least one cowling, the support surface defining a receiving recess, the receiving recess being in alignment with the magnet along a normal of the support surface. The ferromagnetic plate is configured to connect to the device, the ferromagnetic plate being sized and shaped to be received in the receiving recess, the ferromagnetic plate being selectively magnetically connected to the magnet. When the ferromagnetic plate is connected to the device and received in the receiving recess, the ferromagnetic plate is magnetically connected to the magnet, and in response to a force causing the ferromagnetic plate to disconnect from the magnet, a bottom edge of the device contacts the support surface at a contact point positioned below the receiving recess, and the device pivots about a pivot axis passing through the contact point.

In some embodiments, a furthermost point of the device relative to the receiving recess is disposed vertically lower than the receiving recess.

In some embodiments, a magnitude of force required to cause the ferromagnetic plate to disconnect from the magnet increases as a distance between the receiving recess and the furthermost point of the device increases.

In some embodiments, the ferromagnetic plate includes a device engaging surface configured to be engaged with the device, and a support surface engaging surface configured to engage the support surface within the receiving recess.

In some embodiments, the ferromagnetic plate is configured to be adhered to the device.

In some embodiments the mounting assembly further comprises a double-faced tape layer for adhering the ferromagnetic plate to the device.

In some embodiments, the ferromagnetic plate is configured to be rotationally fixed relative to the at least one cowling when the ferromagnetic plate is received in the receiving recess.

In some embodiments, the ferromagnetic plate is rotationally fixed relative to the at least one cowling by contact between a periphery of the ferromagnetic plate and a periphery of the receiving recess.

In some embodiments, the at least one cowling defines a magnet receiving recess for receiving at least part of the magnet therein.

In some embodiments, the vehicle further includes a metallic plate disposed on the interior side of the at least one cowling, the magnet being disposed between the at least one cowling and the metallic plate.

In some embodiments, the metallic plate abuts the magnet.

In some embodiments, the vehicle further includes a cap connected to the interior side of the at least one cowling, the cap encapsulating the magnet.

In some embodiments, the at least one cowling further defines an accessing recess on the exterior side, the accessing recess being disposed vertically below the receiving recess, and the accessing recess being configured to, when the device is connected to the vehicle, provide access to an underside of the device.

In some embodiments, the bottom edge of the device is vertically positioned between top and bottom edges of the accessing recess.

In some embodiments, with the device being connected to the mounting assembly, the support surface extends below the bottom edge of the device.

In some embodiments, the at least one cowling is a cover of a storage compartment defining a storage chamber, and the cover is moveable between an open position for providing access to the storage chamber and a closed position for restricting access to the storage chamber.

In some embodiments, the cover is pivotable between the open and closed positions about a lateral axis.

In some embodiments, in the closed position, an angle formed by an intersection of the support surface and a horizontal plane is an obtuse angle.

In some embodiments, the angle is between about 95 degrees and 110 degrees.

In some embodiments, the vehicle further includes the device.

In some embodiments, the device is one of a tablet and a phone.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures may not be drawn to scale.

DETAILED DESCRIPTION

The present technology will be described with respect to a four-wheel all-terrain vehicle 10 having a straddle seat and a steering handle. However, it is contemplated that some aspects of the present technology may apply to other types of vehicles such as, but not limited to, off-road vehicles having more or less than four wheels, all-terrain vehicles having side-by-side seats, having tracks, and watercraft.

Figure 1:
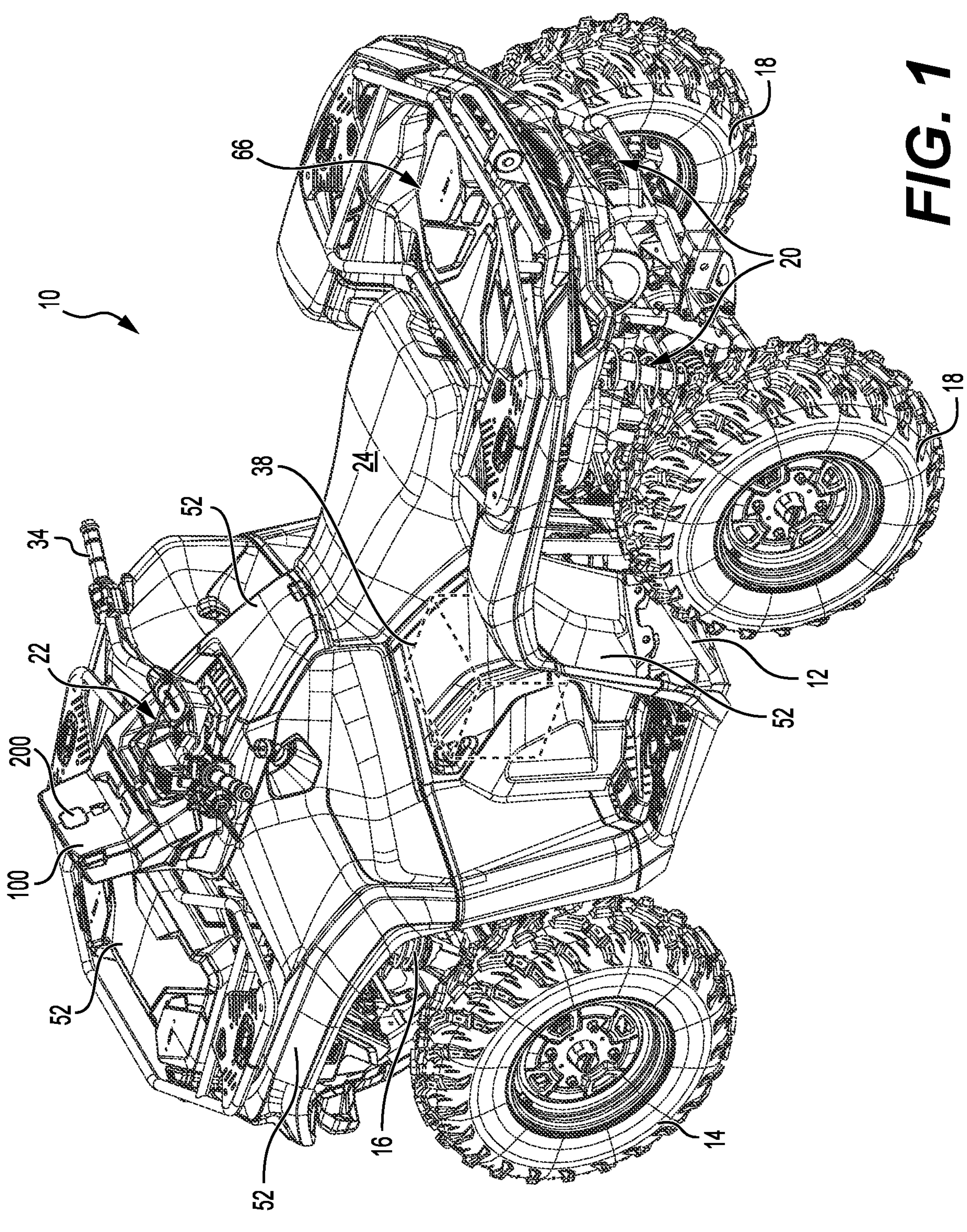
FIG. 1 is a perspective view taken from a top, rear, left side of an all-terrain vehicle.

The general features of the all-terrain vehicle 10 will be described with respect to FIG. 1. The vehicle 10 has a frame 12, two front wheels 14 (only one being shown) connected to a front of the frame 12 by front suspension assemblies 16 and two rear wheels 18 connected to the frame 12 by rear suspension assemblies 20. It is contemplated that in other embodiments, the front and rear wheels 14, 18 could be other ground-engaging members such as track systems.

The vehicle 10 includes a straddle seat 24. It is contemplated that in some embodiments, the straddle seat 24 could include a backrest and/or could be configured to seat a passenger thereon.

A steering handle 34 is disposed in front of the straddle seat 24. The steering handle 34 is used to turn the front wheels 14 to steer the vehicle 10. Various displays and gauges (not shown) are provided on a dashboard area 22 to provide information to the driver regarding the operating conditions of the vehicle 10. Examples of displays and gauges include, but are not limited to, a speedometer, a tachometer, a fuel gauge, a transmission position display, and an oil temperature gauge.

A storage compartment 100 is disposed in front of the straddle seat 24, partially above the dashboard area 22. The vehicle 10 also includes a mounting assembly 200 in accordance with an embodiment of the present technology that is disposed in part on the storage compartment 100. The storage compartment 100 and the mounting assembly 200 will be described in greater detail below.

The vehicle 10 includes a motor 38 (shown schematically) connected to and supported by the frame 12. In the present embodiment, the motor 38 is an internal combustion engine, but it is contemplated that various types of motors could be used such as, but not limited to, in-line engines, V-type engines, two-stroke or four-stroke engines, electric motors, hybrid motors, and diesel engines. The motor 38 is operatively connected via a transmission (not shown) to one or both of the two rear wheels 18 and the two front wheels 14 for driving the vehicle 10.

The vehicle 10 further includes cowlings 52 connected to the frame 12, also referred to as body panels 52. The cowlings 52 help protect the internal components of the vehicle 10 and provide some of the aesthetic features of the vehicle 10. At the rear of the vehicle 10, the cowlings 52 define a cargo space 66 therebetween, rearward of the straddle seat 24.

Figure 2:
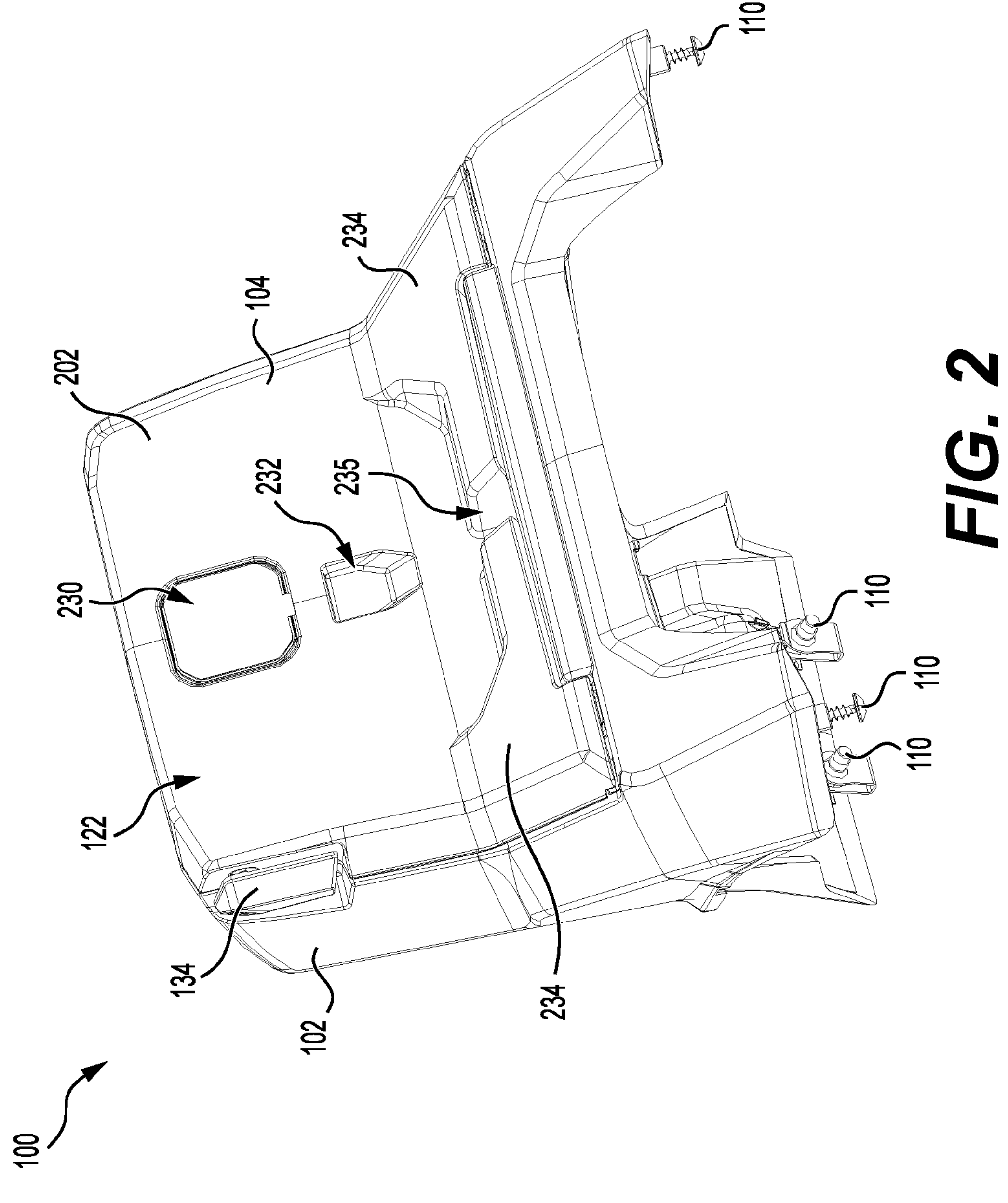
FIG. 2 is a perspective view taken from a top, rear, left side of a storage compartment of the vehicle of FIG. 1, the storage compartment having a mounting assembly according to a non-limiting embodiment of the present technology.
Figure 3:
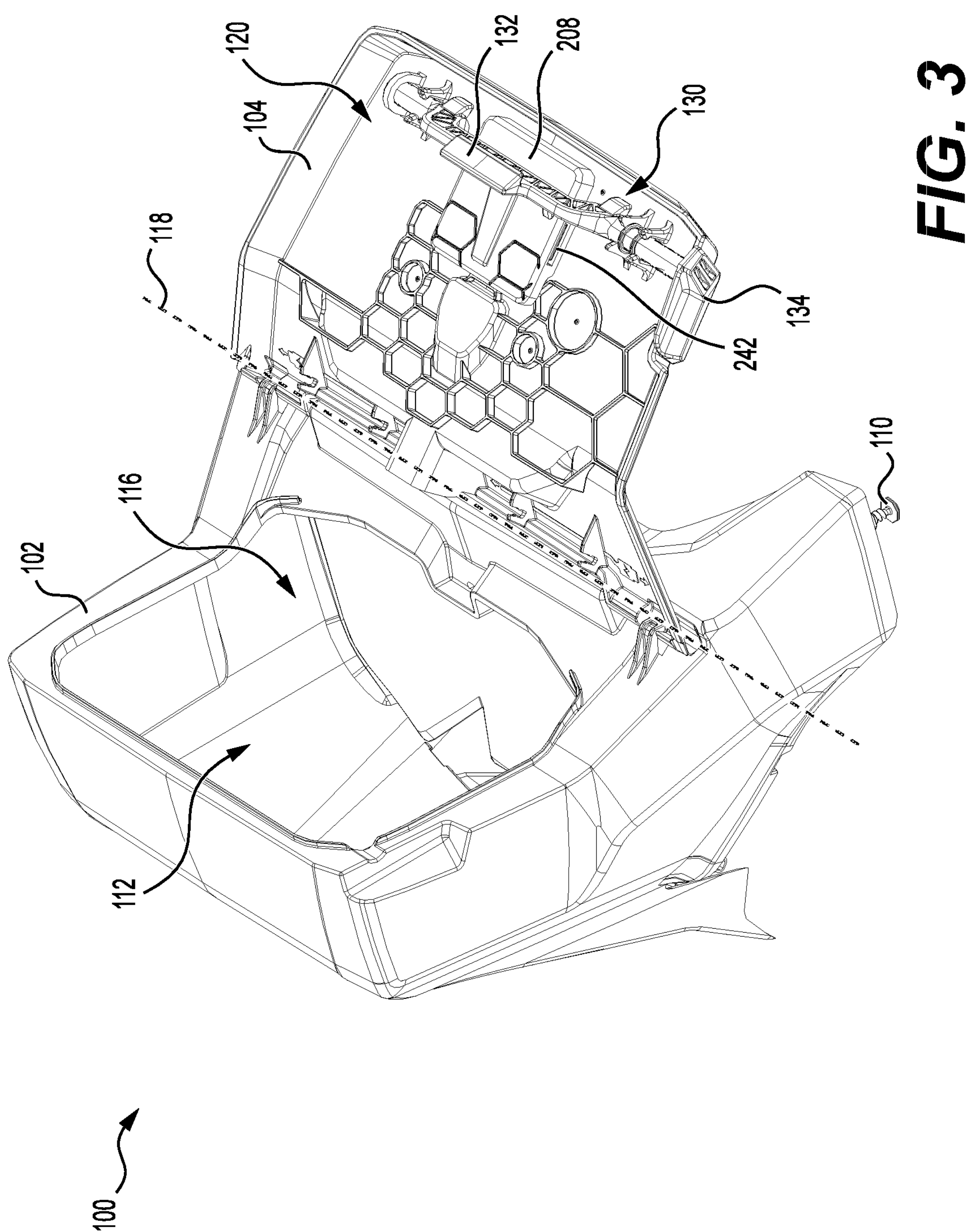
FIG. 3 is a perspective view taken from a top, rear, left side of the storage compartment of FIG. 2, with a cover of the storage compartment being in an open position.

With reference to FIGS. 2 and 3, the storage compartment 100, which includes a base cowling 102 and a cover 104, will now be described in greater detail. The storage compartment 100 is disposed on the dashboard area 22 of the vehicle 10, in front of the straddle seat 24. It is contemplated that in other embodiments, the storage compartment 100 could be disposed elsewhere.

Figure 7A:
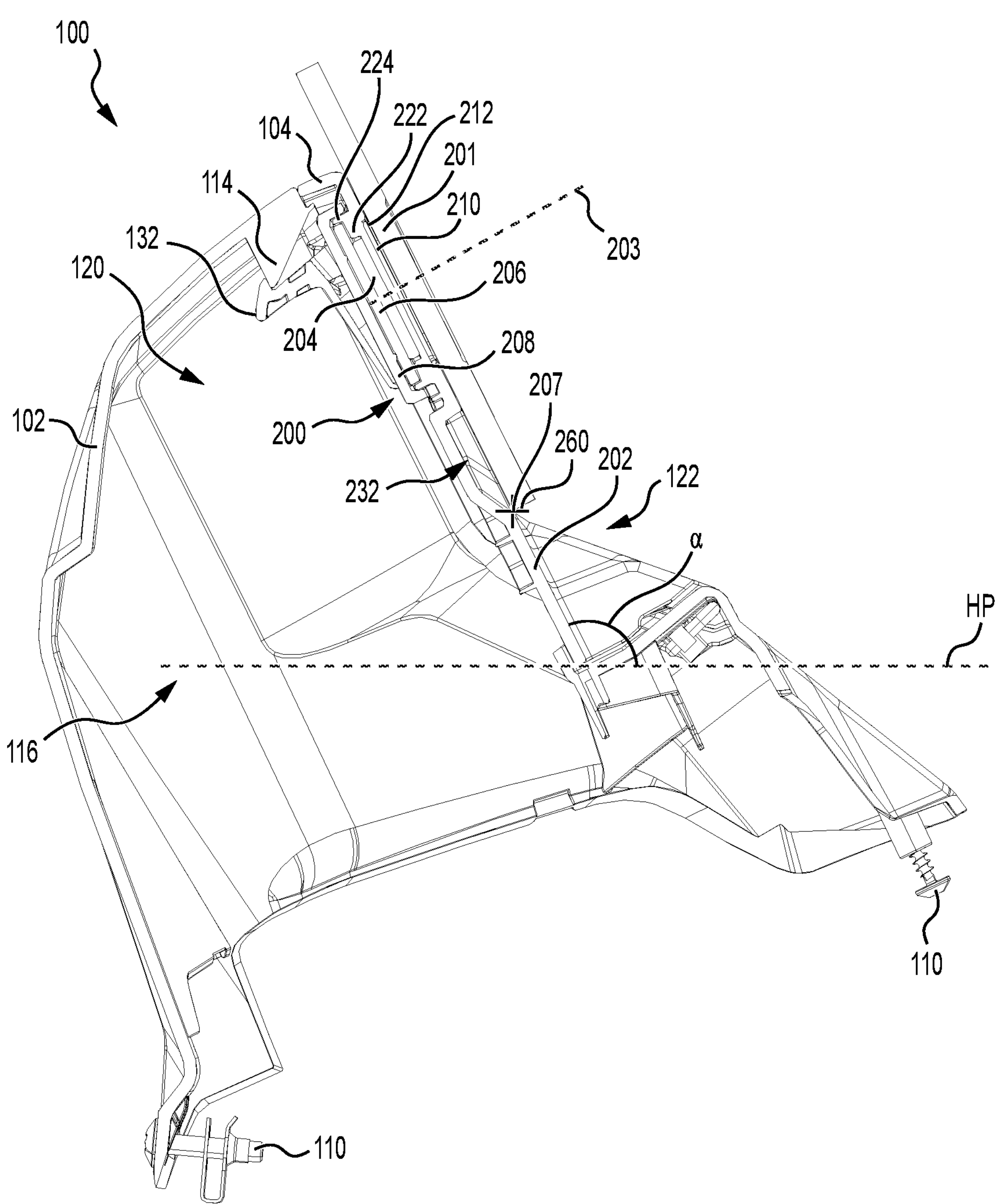
FIG. 7A is a cross-sectional view of the storage compartment and device of FIG. 5 taken along line 7A-7A of FIG. 5.

The base cowling 102 is connected to the frame 12 of the vehicle 10. In the illustrated embodiment, the base cowling 102 is connected to the frame 12 via fasteners 110, but it is contemplated that connection between the base cowling 102 and the frame 12 may vary from one embodiment to another. The base cowling 102, which extends generally upwardly from the dashboard, defines a storage aperture 112 that is selectively closable by the cover 104. The base cowling 102 has, toward an upper end of the storage aperture 112, a retaining lip 114 (FIGS. 7A, 7B and 8), which, as will also be described below, is selectively engageable by the cover 104. The base cowling 102 partially defines a storage chamber 116 that can be used to store items therein. In the illustrated embodiment, a bottom of the storage chamber 116 is defined by another cowling 52 since the base cowling 102 is open-ended from a bottom thereof. In other embodiments, the base cowling 102 could have a bottom surface defining a bottom of the storage chamber 116 or an additional surface could be disposed in the storage chamber 116.

The cover 104 is movably connected to the base cowling 102. More specifically, the cover 104 is pivotally connected to the base cowling 102 about an axis 118. The axis 118 is a lateral axis 118. It is contemplated that in other embodiments, the orientation of the axis 118 may vary. For example, in some embodiments, the axis 118 could be a vertical axis. It is also contemplated that in some embodiments, the cover 104 may be pivotally connected to the frame 12 or another cowling 52 instead of the base cowling 102. In the present embodiment, the cover 104 can be pivoted about the axis 118 between a closed position (shown in FIG. 2) and an open position (shown in FIG. 3). The cover 104 is shaped and sized such that when the cover 104 is in the closed position, the cover 104 covers the storage aperture 112, and thereby restricting access to the storage chamber 116. When the cover 104 is in the open position, the storage chamber 116 may be accessed.

The cover 104 has an interior side 120 that is oriented toward the storage chamber 116 when the cover 104 is in the closed position, and an exterior side 122 that is oriented toward the straddle seat 24 when the cover 104 is in the closed position.

Referring to FIGS. 2, 3, 7A and 8, the cover 104 includes a locking assembly 130 that is disposed on the interior side 120, and at a top of the cover 104. The locking assembly 130 includes a lock 132 and a handle 134 that is operatively connected to the lock 132. The lock 132 is moveable between a locked position and an unlocked position and is biased toward the locked position by a biasing member (not shown). In some embodiments, the biasing member may be a rotational spring. The handle 134 is selectively operable to cause the lock 132 to move between the locked and unlocked positions. When the cover 104 is in the closed position and the lock 132 is in the locked position, the lock 132 engages the retaining lip 114, such that the cover 104 is prevented from moving away from the closed position. When the cover 104 is in the closed position, and the lock 132 is in the unlocked position (by way of the handle 134), the lock 132 is moved away from the retaining lip 114, and is therefore disengaged therefrom, such that the cover 104 may be moved away from the closed position. The lock 132 and the retaining lip 114 are configured, due to their shapes and the lock 132 being biased toward the locked position, so that when the cover 104 is moved to the closed position, the lock 132 clips onto the retaining lip 114 without having to operate the handle 134.

Figure 8:
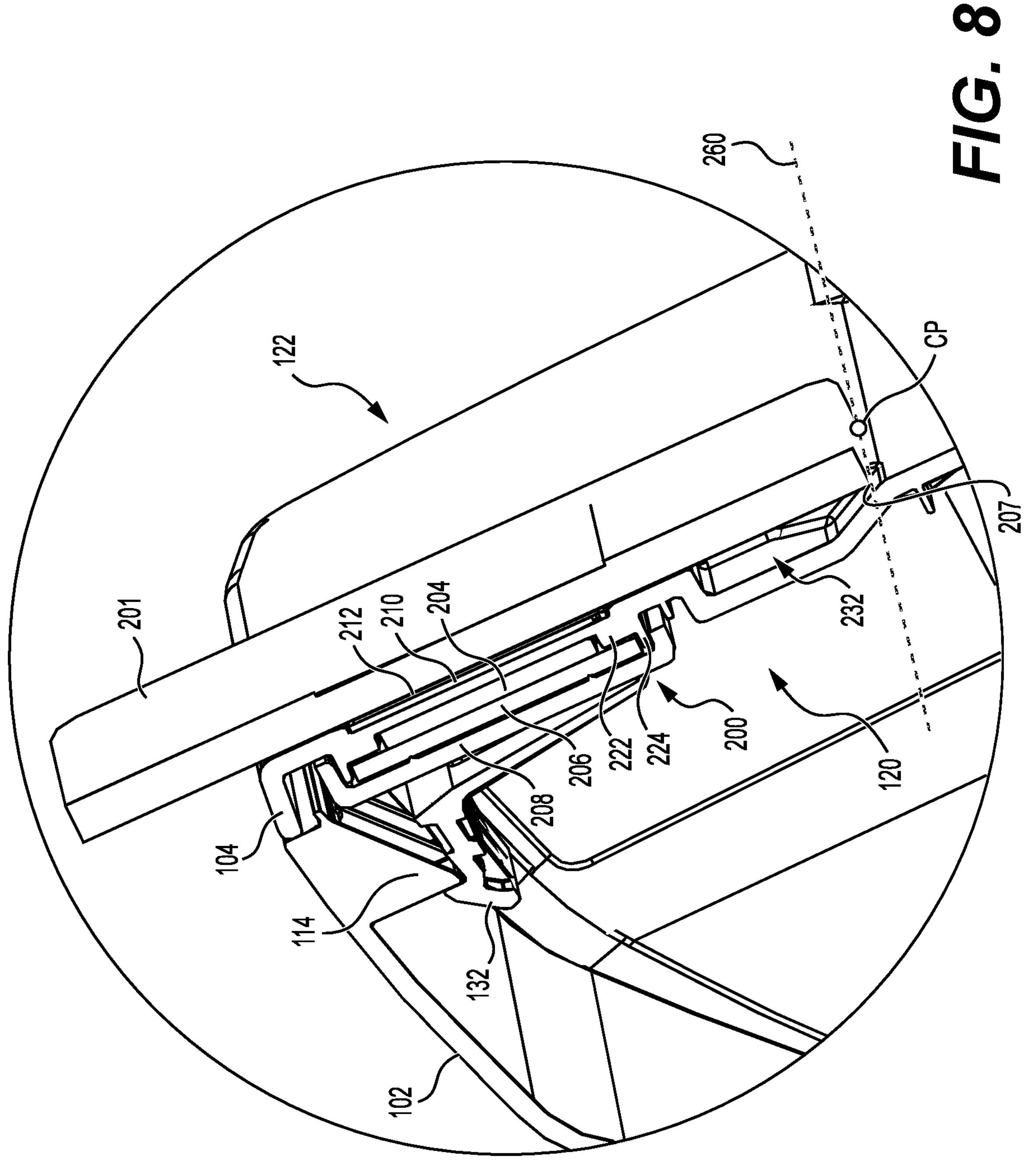
FIG. 8 is a close-up view of the cross-section of the mounting assembly of FIG. 7A.
Figure 9:
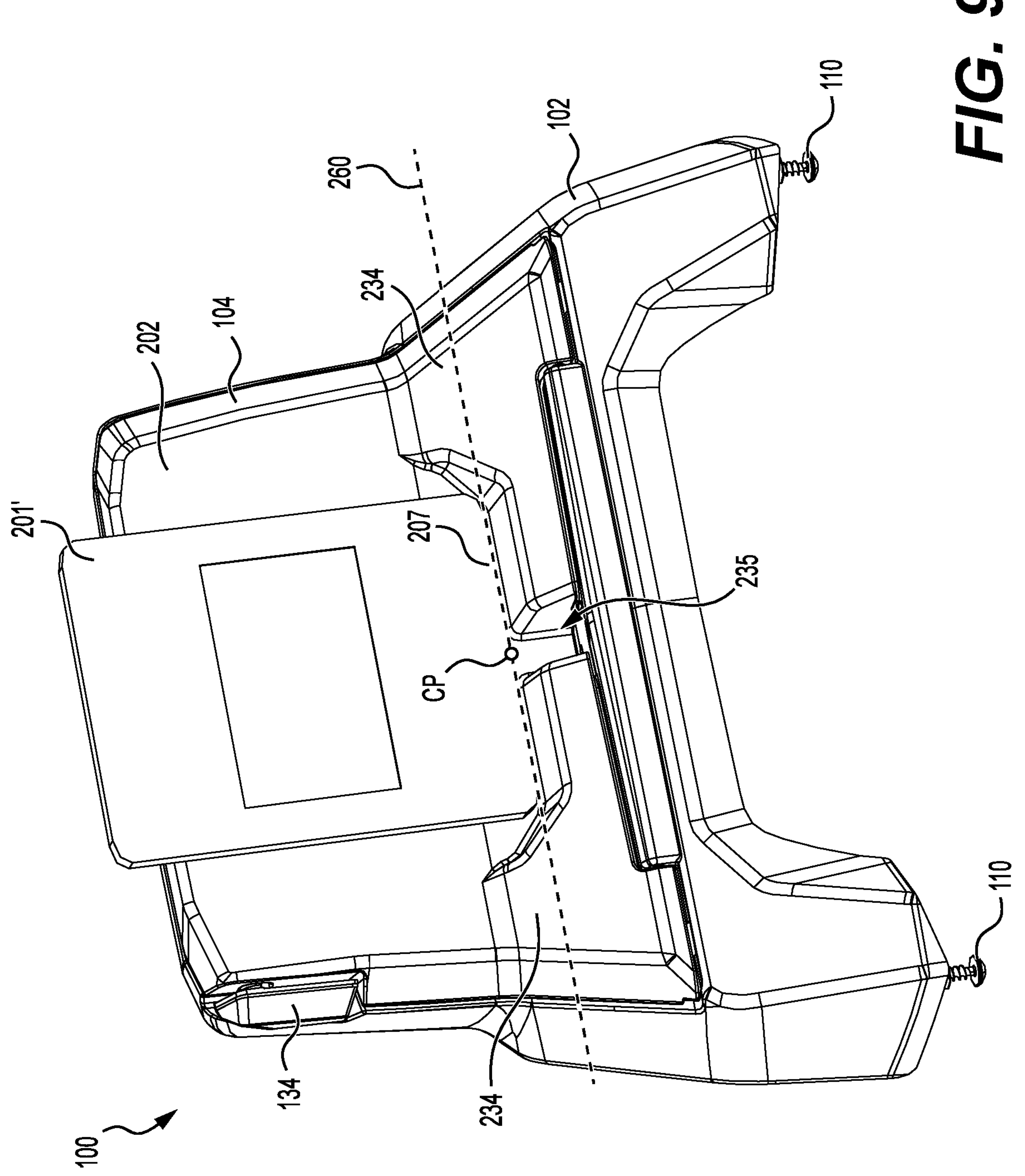
FIG. 9 is a perspective view taken from a top, rear, left side of the storage compartment of FIG. 2, with an alternative device mounted on the mounting assembly.

The mounting assembly 200 will now be described in greater detail. The mounting assembly is for mounting, or selectively connecting, a device 201 to the vehicle 10. The device 201 can be one of a plurality of different items, such as a mobile phone, a tablet or a global positioning system (GPS). In the embodiment illustrated in FIGS. 5 to 8, the device 201 is a mobile phone 201. In the embodiment illustrated in FIG. 9, the device 201' is a tablet 201' that is larger than the mobile phone 201.

In the illustrated embodiment, the mounting assembly 200 is partially formed by the storage compartment 100. As such, the mounting assembly 200 is described with reference to the storage compartment 100. It is contemplated, however, that the mounting assembly 200 may be present on the vehicle 10 without the storage compartment 100. For example, in some embodiments, the mounting assembly 200 could be disposed on the dashboard, formed by one of the cowlings 52 inside the vehicle cockpit, or on an underside of the roof 90.

The mounting assembly 200 includes one of the cowlings 52 of the vehicle 10, specifically the cover 104 of the storage compartment 100 in the present embodiment. The mounting assembly 200 includes a support surface 202 defined on the cowling 52, thus on the cover 104 in this embodiment. The mounting assembly 200 further includes a magnet 204, a metallic plate 206, a cap 208 and a ferromagnetic plate 210. In some embodiments, the device 201 may be considered as being part of the mounting assembly 200. As will be described further below, the ferromagnetic plate 210 is connected to the device 201 for selectively connecting the device 201 to the cover 104 via magnetic connection of the ferromagnetic plate 210 and the magnet 204.

Referring to FIGS. 2, 4 and 6 to 8, the cover 104, as it relates to the mounting assembly 200, will now be described in greater detail.

On the interior side 120, the cover 104 defines a magnet receiving recess 220 that at least partially receives the magnet 204 therein. The cover 104 has flanges 222 that extend toward the interior side 120 and that define the magnet receiving recess 220. Also on the interior side 120, the cover 104 has flanges 224 that surround the flanges 222. The flanges 224 receive the metallic plate 206 therebetween and are engageable by the cap 208.

On the exterior side 122, the cover 104 defines the support surface 202. As mentioned above, in embodiments where the mounting assembly 200 is not integrated to the storage compartment 100, the support surface 202 may be defined elsewhere than on the cover 104, (e.g., on the cowlings 52). The support surface 202 defines a receiving recess 230 that receives the ferromagnetic plate 210 (described below). It is to be noted that the receiving recess 230 is generally aligned with the magnet receiving recess 220 about a normal 203 of the support surface 202. The receiving recess 230 is laterally centered on the cover 104 in the present embodiment. The receiving recess 230 is vertically offset from a vertical center of the cover 104, and more specifically is closer to a top edge of the cover 104 than a bottom edge thereof. As will be described below, this configuration can assist in increasing the force required to disconnect the device 201 from the mounting assembly 200. The receiving recess 230 has an octagonal shape. It is contemplated that the receiving access 230 could be differently shaped in different embodiments.

The support surface 202 also has defined therein an accessing recess 232 that is positioned vertically lower than the receiving recess 230. In the present embodiment, the accessing recess 232 is laterally centered on the cover 104, although different positions are possible. The cover 104 further has left and right ridges 234 that are disposed on, respectively, left and right sides of the cover 104. The left and right ridges 234 are laterally spaced from one another and define an opening 235 therebetween.

Figure 4:
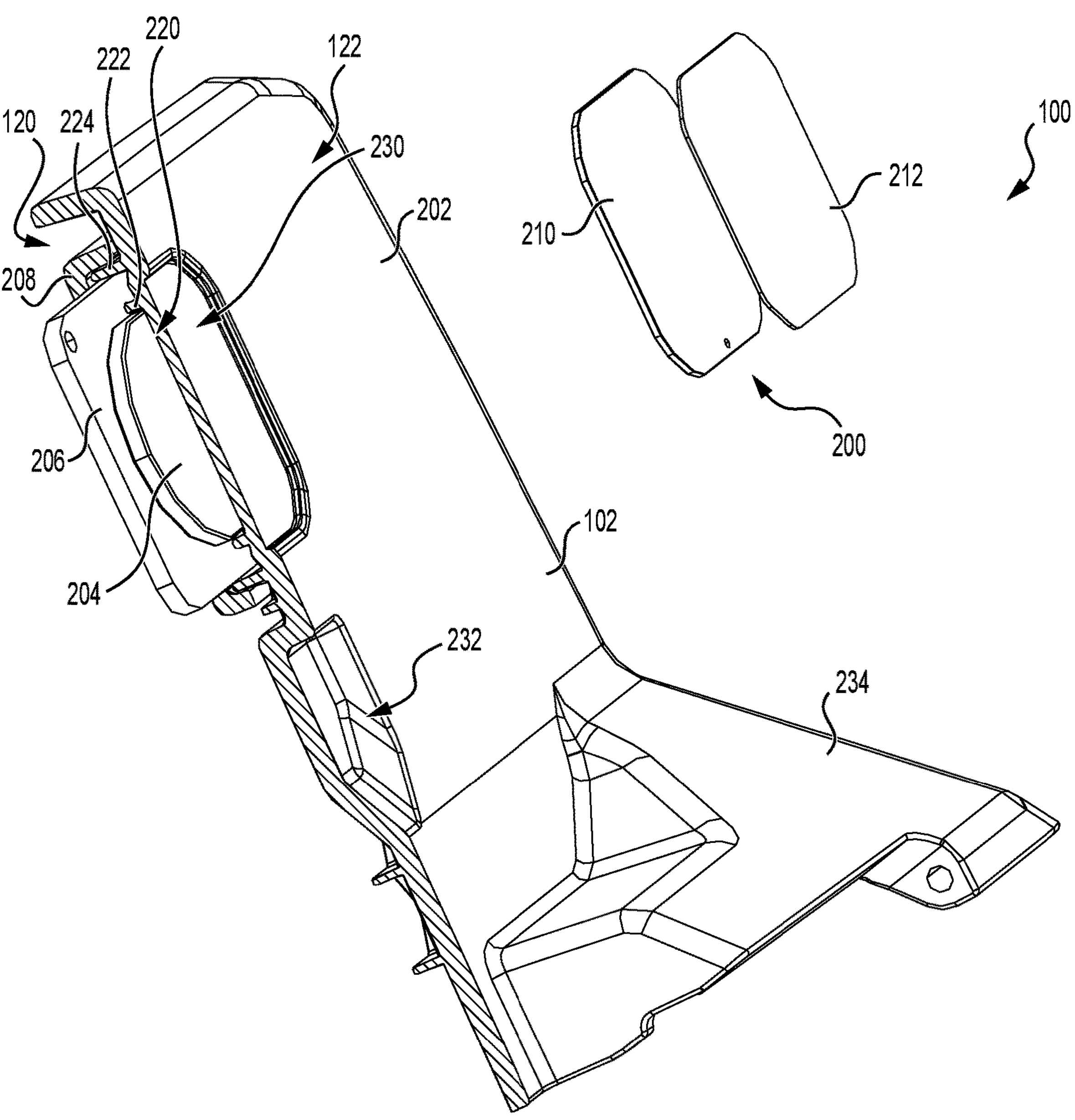
FIG. 4 is a partially exploded and partial cross-sectional perspective view taken from a top, rear, left side of the mounting assembly of FIG. 2.
Figure 5:
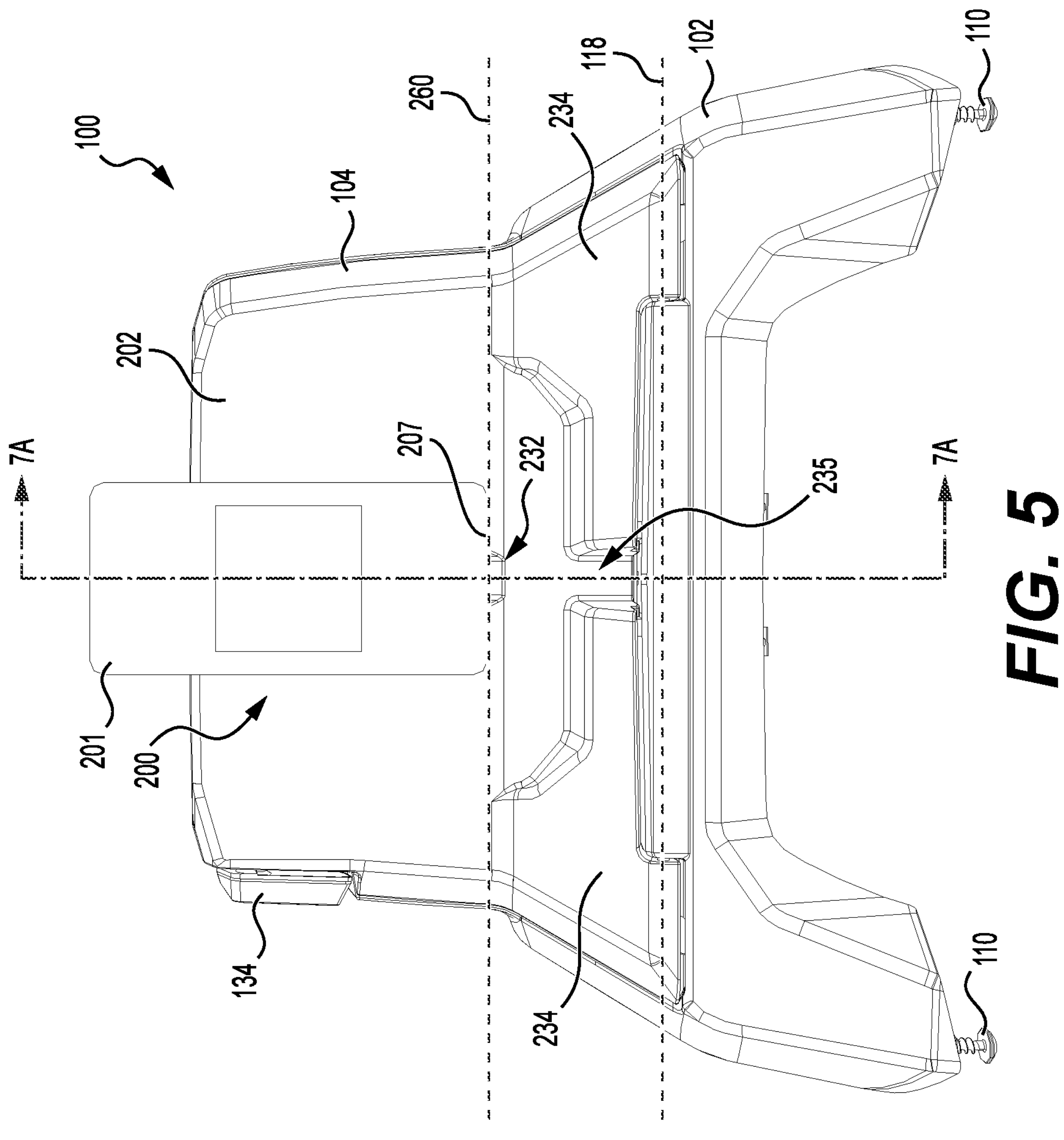
FIG. 5 is a rear elevation view of the storage compartment of FIG. 2, with a device mounted on the mounting assembly.
Figure 6:
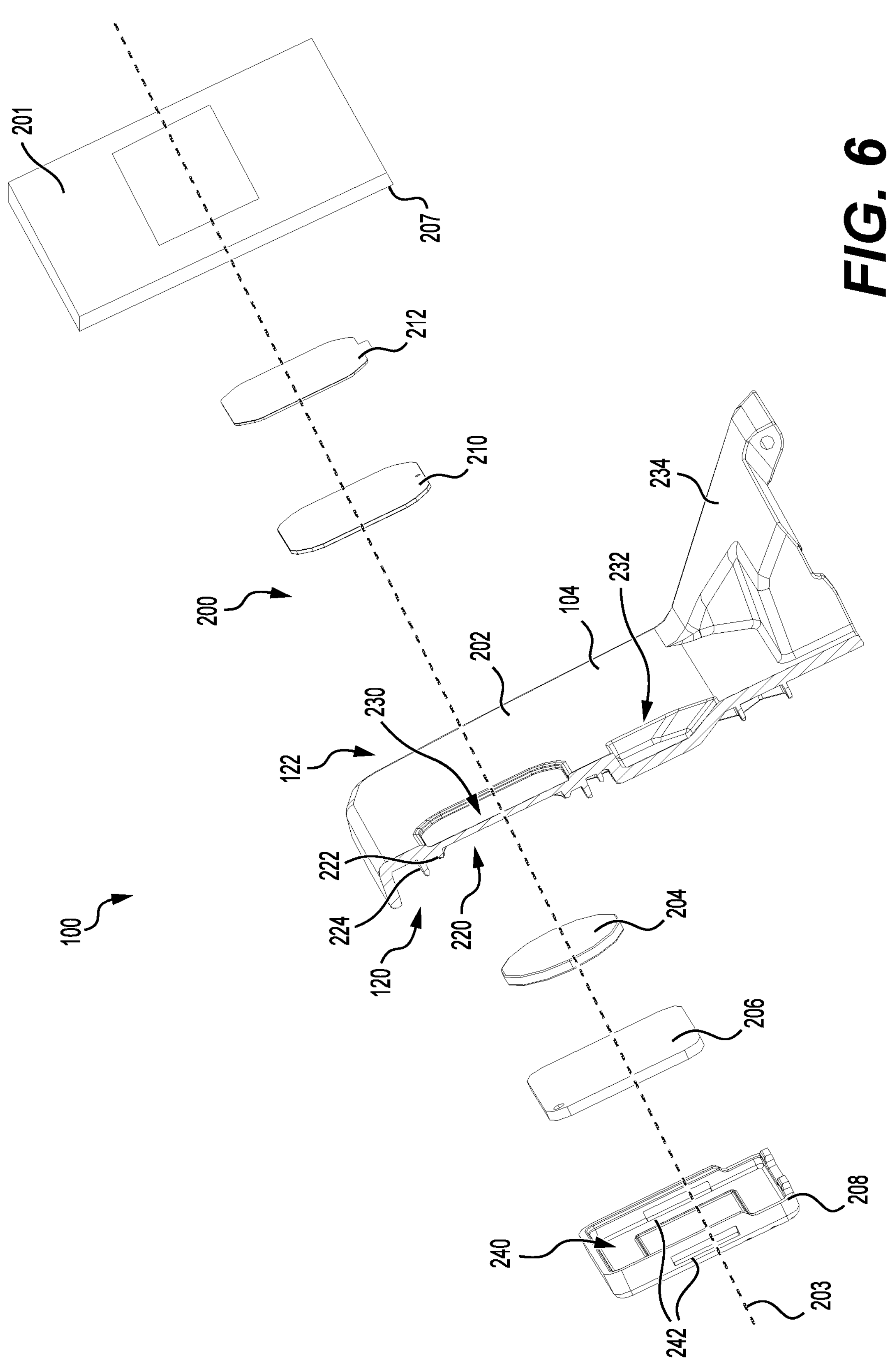
FIG. 6 is a partially exploded and partial cross-sectional perspective view taken from a top, rear, left side of the storage compartment and device of FIG. 5.

Referring to FIG. 4, the magnet 204 is disposed on the interior side 120 of the cover 104. More specifically, the magnet 204 is received in the magnet receiving recess 220. Thus, the magnet 204 is shaped and sized to fit within the magnet receiving recess 220. It is to be noted that a periphery of the magnet 204 has a plurality of edges, such when the magnet 204 is received in the magnet receiving recess 220, the magnet 204 is rotationally fixed relative to the cover 104 due to a contact between the periphery of the magnet 204 and the flanges 222 defining the magnet receiving recess 220. In the illustrated embodiment, the magnet 204 is sized such that it partially extends out of the magnet receiving recess 220 (best seen in FIG. 7A). The magnet receiving recess 220 assists in reducing a distance between the magnet 204 and the support surface 202 (and reducing a distance between the magnet 204 and the ferromagnetic plate 210 when it is received in the receiving recess 230). It is contemplated that in some embodiments, the magnet 204 could be connected to the cover 104 without being received in a recess.

The metallic plate 206 is also disposed on the interior side 120. More specifically, the metallic plate 206 is disposed longitudinally between the magnet 204 and the storage chamber 116, such that the magnet 204 is positioned between the cover 104 and the metallic plate 206. The metallic plate 206 is received between the flanges 224. The metallic plate 206 has a rectangular shape (i.e., has edges). Thus, when the metallic plate 206 is received between the flanges 224, the metallic plate 206 is rotationally fixed relative to the cover 104 due to a contact between a periphery of the metallic plate 206 and the flanges 224. In the present embodiment, the metallic plate 206 abuts the magnet 204. The metallic plate 206 can assist in preventing magnetic forces of the magnet 204 from reaching the items stored in the storage chamber 116. Additionally, the metallic plate 206 can assist in re-directing magnetic forces of the magnet 204 toward the exterior side 122.

The cap 208 is also disposed on the interior side 120. The cap 208 defines a cap recess 240 which is sized to receive the metallic plate 206 and the magnet 204 therein. The cap 208 includes lateral clips 242 configured to clip onto the flanges 224. When the lateral clips 242 are clipped onto the flanges 224, the cap 208 encapsulates the metallic plate 206 and the magnet 204 in the cap recess 240. The cap 208 abuts the metallic plate 206, which in turn abuts the magnet 204, which in turn abuts the cover 104. Thus, the cap 208 restricts movement of the metallic plate 206 and the magnet 204 away from the cover 104. In some embodiments, the cap 208 could be made of a metallic material, such that the metallic plate 206 may be omitted. In other embodiments, the cap 208 could be omitted, and movement of the metallic plate 206 and the magnet 204 may be restricted differently, for example via an adhesive.

The ferromagnetic plate 210 is made from a ferromagnetic material for selectively magnetically connecting with the magnet 208. In some instances, the ferromagnetic plate 210 is made of an iron alloy. The ferromagnetic plate 210, configured to be connected to the device 201, is sized and shaped to be received in the receiving recess 230. In the illustrated embodiment, the ferromagnetic plate 210 is complementary to the shape of the receiving recess 230, the ferromagnetic plate 210 having an octagonal shape. It is understood that a size of the ferromagnetic plate 210 is smaller than a size of the receiving recess 230 so that the ferromagnetic plate 210 may fit into the receiving recess 230. It is contemplated that in other embodiments, the receiving recess 230 and the ferromagnetic plate 210 could have other shapes (e.g., rectangular shape). The ferromagnetic plate 210 has a support surface engaging surface 250 and a device engaging surface 252. When the ferromagnetic plate 210 is received in the receiving recess 230, the support surface engaging surface 250 contacts the support surface 202 within the receiving recess 230.

In the present embodiment, the ferromagnetic plate 210 is connected to the device 201 by a double-face tape layer 212, such that the ferromagnetic plate 210 is adhered to the device 201. The double-face tape layer 212 is applied to the device engaging surface 252 of the ferromagnetic plate 210. When the device 201 is not mounted on the support surface 202, the ferromagnetic plate 210 remains connected to the device 201. It is to be noted that the double-face tape layer 212 has a small thickness, which can be advantageous in minimizing distance between the device 201 and the magnet 204. In some instances, disconnecting the ferromagnetic plate 210 from the device 201 may render the double-face tape layer 212 unusable, and a new double-face tape layer 212 would be required to re-connect the ferromagnetic plate 210 to the device 201. It is contemplated that in other embodiments, the ferromagnetic plate 210 could be connected or adhered to the device 201 differently.

The receiving recess 230, the ferromagnetic plate 210 and the double-face tape layer 212 are sized such that when the ferromagnetic plate 210 is received in the receiving recess 230, part of the double-face tape layer 212 extends out of the receiving recess 230. Thus, a thickness of the ferromagnetic plate 210 and the double-face tape layer 212 is slightly greater than a depth of the receiving recess 230. In some instances, the thickness of the ferromagnetic plate 210 and the double-face tape layer 212 is the same as the depth of the receiving recess 230. This is, notably, for ensuring that the ferromagnetic plate 210 is as close to the magnet 204 as possible.

A description of the mounting assembly 200 in use will now be provided.

Once the ferromagnetic plate 210 is connected to the device 201, by the double-face tape layer 212, a user may selectively mount the device 201 on the cover 104. To mount the device 201 on the cover 104, the user approaches the device 201, and thus the ferromagnetic plate 210, to the receiving recess 230. Eventually, magnetic forces pull the ferromagnetic plate 210 into the receiving recess 230 such that the device 201 is brought into contact with the support surface 202. The user may adjust the device 201 so that the ferromagnetic plate 210 is properly placed in the receiving recess 230. When the ferromagnetic plate 210 is properly placed in the receiving recess 230, a rear surface of the device 201 abuts the support surface 202. When the device 201 is mounted on the cover 104, a bottom edge 207 of the device 201 is positioned between top and bottom edges of the accessing recesses 232. As will be described below, this can assist in disconnecting the device 201 from the cover 104.

Generally, when the device 201 is mounted on the cover 104, the cover 104 is in the closed position. When the cover 104 is in the closed position, the cover 104 is generally oriented in a partially vertical direction. Thus, the support surface 204 is also generally oriented in the partially vertical direction. More specifically, an angle $\alpha$ formed by the support surface 204 and a horizontal plane HP is an obtuse angle. In some embodiments, the angle $\alpha$ is between about 95 degrees and 110 degrees.

Figure 7B:
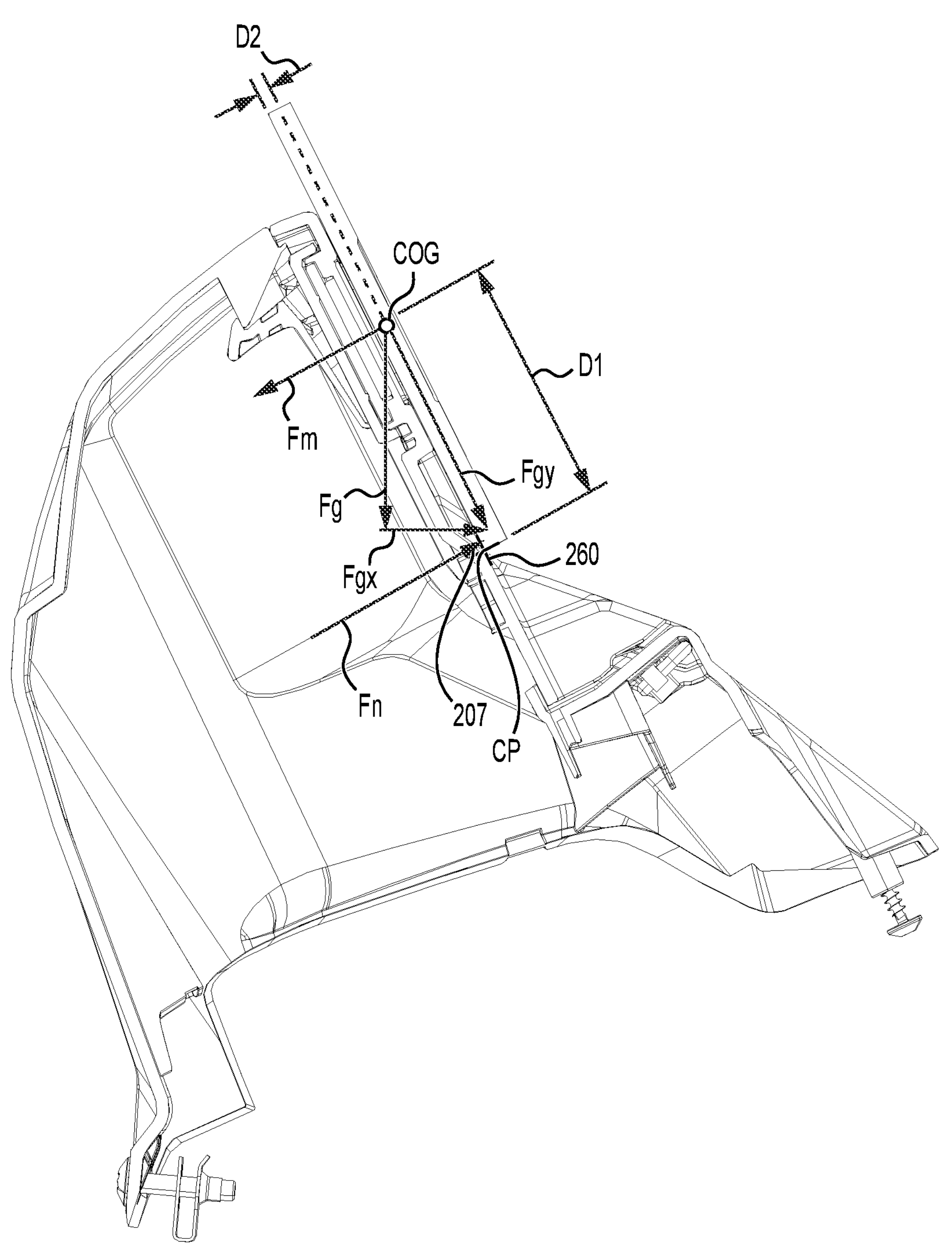
FIG. 7B is the cross-sectional view of the storage compartment and device of FIG. 5 taken along line 7A-7A of FIG. 5, with a force diagram illustration.

While the device 201 is mounted to the cover 104, the device 201 is subjected to a variety of forces, some of which are illustrated in FIG. 7B. Notably, the device 201 is subjected to a magnetic force Fm by way of the ferromagnetic plate 210 and the magnet 204, which aids in keeping the device 201 connected to the cover 104. The orientation of the magnetic force Fm can be considered to pass through the normal 203, the normal 203 passing through centers of the magnet 204 and the ferromagnetic plate 210.

The device 201 is also subjected to a gravitational force Fg, which can cause the device 201 to disconnect from the cover 104. The orientation of the gravitational force Fg is in the vertical direction. Due to the orientation of the support surface 202 and the device 201, the gravitational force Fg has a horizontal gravitational component Fgx and a vertical gravitational component Fgy. Additionally, when the vehicle 10 is in motion, particularly over rough terrain, the device 201 can be subjected to additional forces which can also cause the device 201 to disconnect from the cover 104.

According to the present technology, for a force to cause the device 201 to disconnect from the cover 104, and thereby be a disconnecting force, the ferromagnetic plate 210 has to be pulled away from the magnet 204, and out of the receiving recess 230. For this to occur under gravitational force or disturbance caused by rough terrain, for instance, an upper edge of the device 201 would need to fall away from the support surface 204, with the bottom edge 207 of the device 201 contacting the support surface 204 at a contact point CP. In the present embodiment, the contact point CP is a contact segment. In such a case, the device 201 would pivot about an axis 260. The axis 260 passes through the contact point CP, and generally extends in the lateral direction. A normal force Fn is thus also received by the device 201 at the contact point CP.

Thus, for a force to cause the device 201 to disconnect from the cover 104, a gravitational moment, induced by the gravitational force Fg about the axis 260, must be greater than a magnetic moment, induced by the magnetic force Fm about the axis 260.

The gravitational moment is a product of the part of the gravitational force Fg and a distance D2, where the distance D2 corresponds to a distance between the contact point CP and a center of mass COG of the device 201. In the present embodiment, the center of mass COG is aligned with the normal 203, and the part of the gravitational force Fg depends on a mass of the device 201 and the orientation of the device 201.

The magnetic moment is a product of the magnetic force Fm and a distance D1, where the distance D1 corresponds to a distance between the contact point CP and the normal 203 (as the magnetic force Fm passes therethrough).

As the device 201 increases in size, the magnetic moment increases because the distance D1 increases. Thus, a magnitude of the force required to disconnect the ferromagnetic plate 210 from the magnet 204 increases. As a result of this, the present mounting assembly 200 is suitable for larger devices such as the device 201', illustrated in FIG. 9. Additionally, being that the support surface 204 is large in size, it is configured to accommodate devices of varying sizes.

To manually remove the device 201 from the cover 104, the user may insert a finger in the accessing recess 232 to pull on a rear of the device 201. The device 201 will pivot about a top edge thereof. The top edge of the device 201 is proximate to where the magnetic force is applied and thus requires less force from the user to remove the device 201 than to apply a removing force at a top of the device 201 and making the device 201 pivot about the axis 260. For larger devices, such as the device 201' shown in FIG. 9, a rear of the device 201' may be accessed via the opening 235.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:

a frame;

a plurality of cowlings connected to the frame;

a propulsion assembly supported by the frame; and a mounting assembly for selectively connecting a device to the vehicle, the mounting assembly comprising:

at least one cowling of the plurality of cowlings;

a magnet disposed on an interior side of the at least one cowling;

a support surface defined on an exterior side of the at least one cowling, the support surface defining a receiving recess, the receiving recess being in alignment with the magnet along a normal of the support surface;

a ferromagnetic plate configured to connect to the device, the ferromagnetic plate being sized and shaped to be received in the receiving recess, the ferromagnetic plate being selectively magnetically connected to the magnet, and when the ferromagnetic plate is connected to the device and received in the receiving recess:

the ferromagnetic plate is magnetically connected to the magnet, and in response to a force causing the ferromagnetic plate to disconnect from the magnet, a bottom edge of the device contacts the support surface at a contact point positioned below the receiving recess, and the device pivots about a pivot axis passing through the contact point.

2. The vehicle of claim 1, wherein a furthermost point of the device relative to the receiving recess is disposed vertically lower than the receiving recess.

3. The vehicle of claim 2, wherein a magnitude of force required to cause the ferromagnetic plate to disconnect from the magnet increases as a distance between the receiving recess and the furthermost point of the device increases.

4. The vehicle of claim 1, wherein the ferromagnetic plate includes:

a device engaging surface configured to be engaged with the device, and a support surface engaging surface configured to engage the support surface within the receiving recess.

5. The vehicle of claim 1, wherein the ferromagnetic plate is configured to be adhered to the device.

6. The vehicle of claim 5, wherein the mounting assembly further comprises a double-faced tape layer for adhering the ferromagnetic plate to the device.

7. The vehicle of claim 1, wherein the ferromagnetic plate is configured to be rotationally fixed relative to the at least one cowling when the ferromagnetic plate is received in the receiving recess.

8. The vehicle of claim 7, wherein the ferromagnetic plate is rotationally fixed relative to the at least one cowling by contact between a periphery of the ferromagnetic plate and a periphery of the receiving recess.

9. The vehicle of claim 1, wherein the at least one cowling defines a magnet receiving recess for receiving at least part of the magnet therein.

10. The vehicle of claim 1, further comprising a metallic plate disposed on the interior side of the at least one cowling, the magnet being disposed between the at least one cowling and the metallic plate.

11. The vehicle of claim 10, wherein the metallic plate abuts the magnet.

12. The vehicle of claim 1, further comprising a cap connected to the interior side of the at least one cowling, the cap encapsulating the magnet.

13. The vehicle of claim 1, wherein the at least one cowling further defines an accessing recess on the exterior side, the accessing recess being disposed vertically below the receiving recess, and the accessing recess being configured to, when the device is connected to the vehicle, provide access to an underside of the device.

14. The vehicle of claim 13, wherein the bottom edge of the device is vertically positioned between top and bottom edges of the accessing recess.

15. The vehicle of claim 1, wherein with the device being connected to the mounting assembly, the support surface extends below the bottom edge of the device.

16. The vehicle of claim 1, wherein:

the at least one cowling is a cover of a storage compartment defining a storage chamber; and the cover is moveable between an open position for providing access to the storage chamber and a closed position for restricting access to the storage chamber.

17. The vehicle of claim 16, wherein the cover is pivotable between the open and closed positions about a lateral axis.

18. The vehicle of claim 16, wherein in the closed position, an angle formed by an intersection of the support surface and a horizontal plane is an obtuse angle.

19. The vehicle of claim 18, wherein the angle is between about 95 degrees and 110 degrees.

20. The vehicle of claim 1, further comprising the device.

21. The vehicle of claim 1, wherein the device is one of a tablet and a phone.

* * * * *